United States Patent [19]
Wittig

[11] 3,977,249
[45] Aug. 31, 1976

[54] PROBE MECHANISM FOR THREE DIMENSIONAL INVESTIGATION OF CONDITIONS IN A FLUID FLOW

[75] Inventor: Juergen Michael Wittig, Newton Square, Pa.

[73] Assignee: Westinghouse Electric Corporation, Pittsburgh, Pa.

[22] Filed: Nov. 14, 1974

[21] Appl. No.: 523,943

[52] U.S. Cl. ................................................ 73/212
[51] Int. Cl.² ............................................ G01F 1/46
[58] Field of Search ...................... 73/147, 182, 212

[56] References Cited
UNITED STATES PATENTS

| | | | |
|---|---|---|---|
| 1,295,046 | 2/1919 | Lohnes | 73/212 |
| 3,113,454 | 12/1963 | Fakan | 73/212 X |
| 3,386,277 | 6/1968 | Hennings | 73/1 |
| 3,474,669 | 10/1969 | Carter et al. | 73/212 X |
| 3,699,811 | 10/1972 | Maiden et al. | 73/212 X |

*Primary Examiner*—Herbert Goldstein
*Attorney, Agent, or Firm*—G. H. Telfer

[57] ABSTRACT

A probe mechanism for three-dimensional investigation of conditions in a fluid flow such as exists in a turbo-machine. A sensing head having five sensing orifices therein is mounted on a movable probe finger. The probe finger is interchangeable and streamlined to permit measurement of conditions with minimum flow interference. A movable probe shaft supports the probe finger. The probe finger is movable in a radial, a circumferential, and a polar direction. In addition, a dual eccentric drive permits the probe shaft to be relocated and positioned accurately at any point within a predetermined area. Since the sensing head can be completely aligned with the fluid flow vector, calibration efforts are greatly reduced.

5 Claims, 18 Drawing Figures

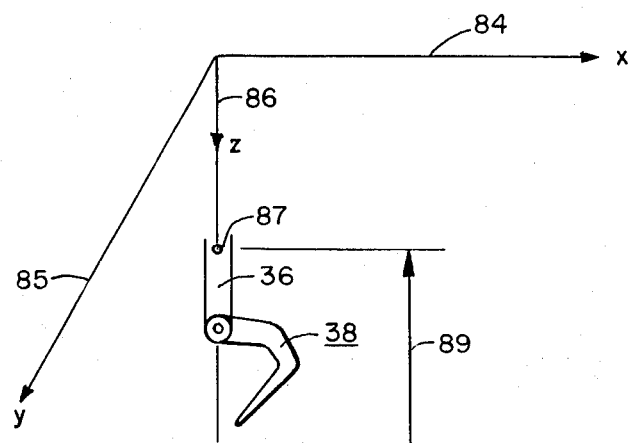
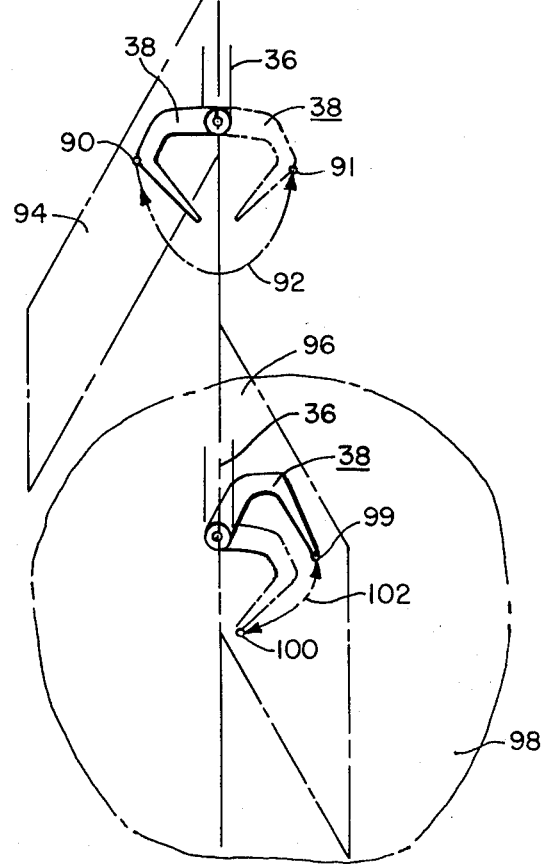
FIG. 2

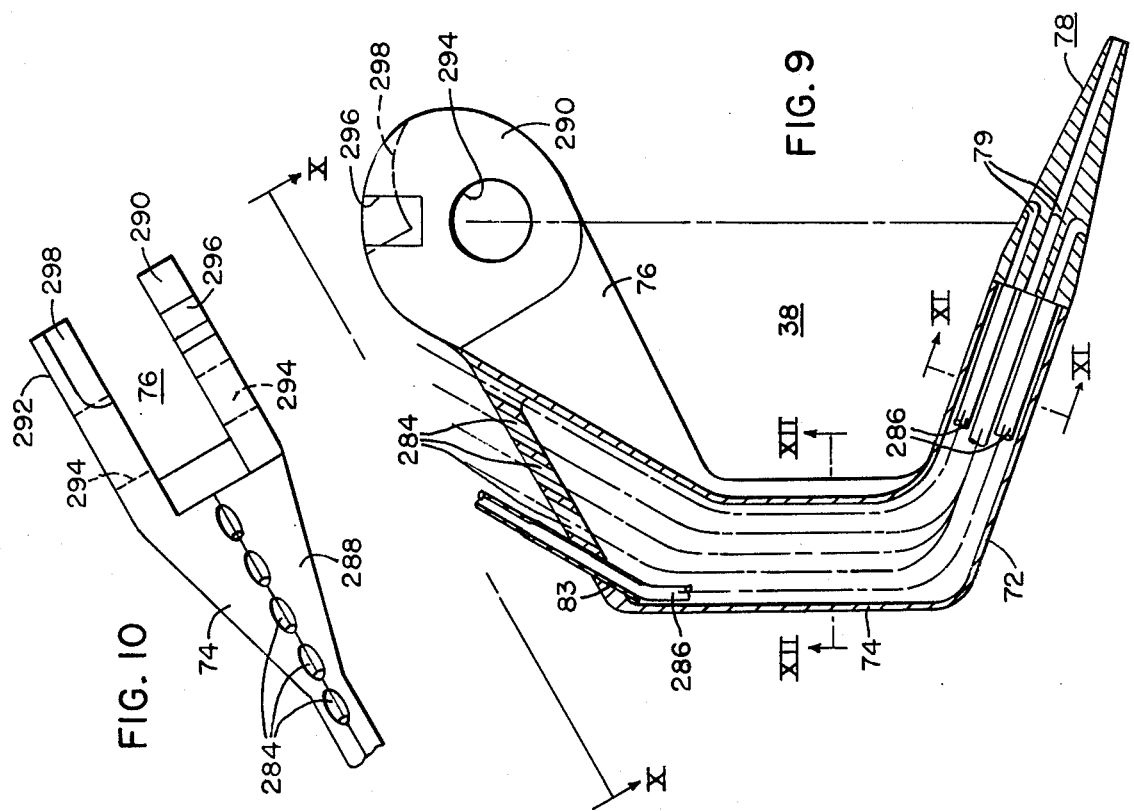
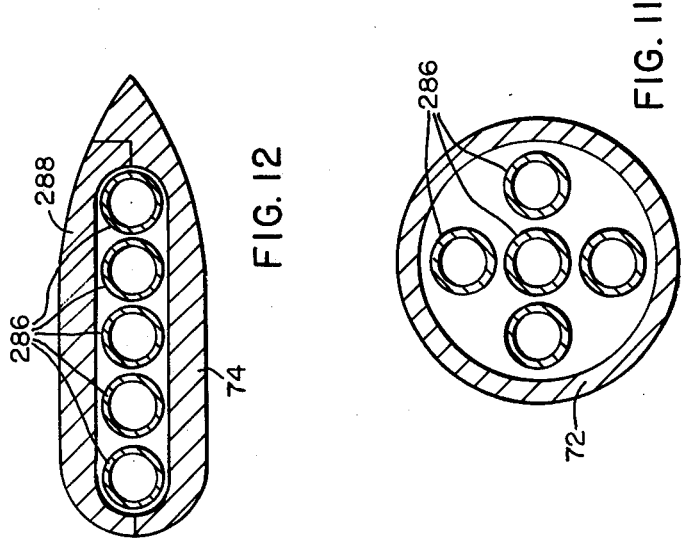

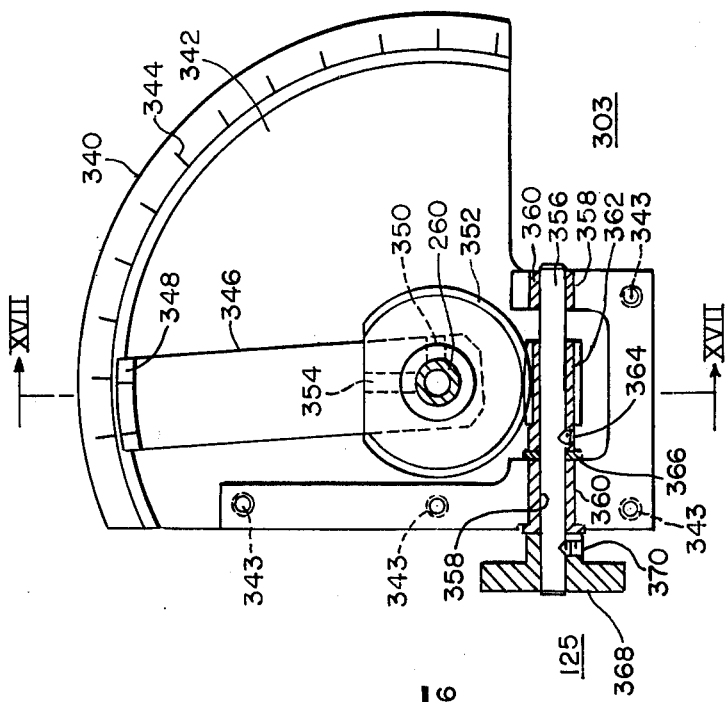
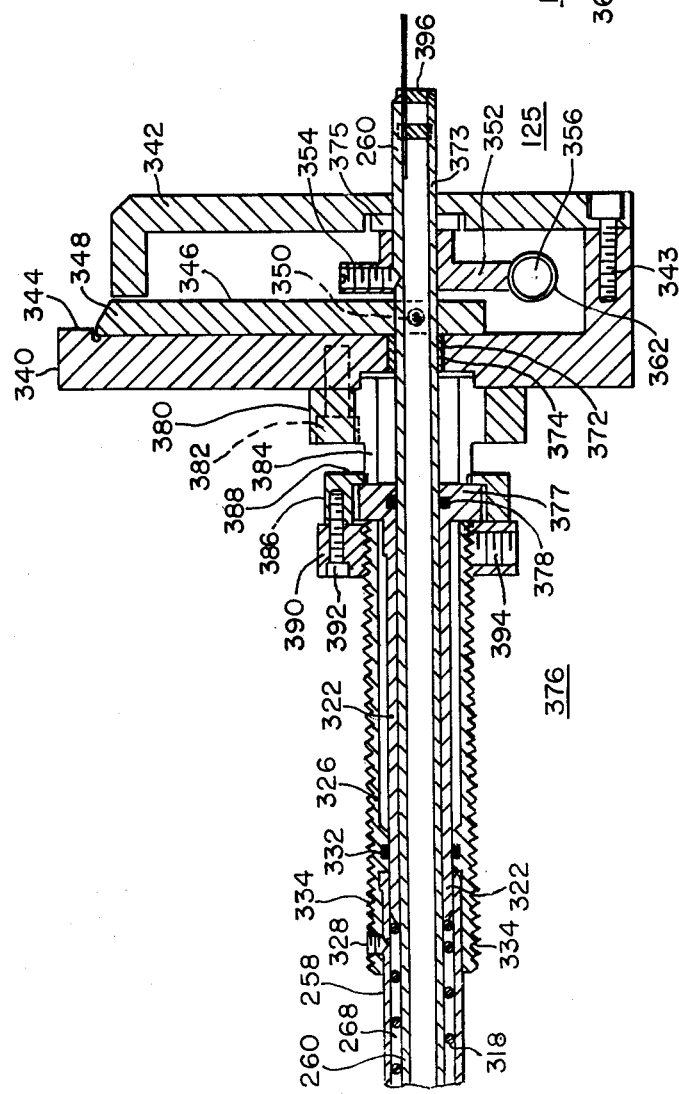
FIG. 16
FIG. 17

PROBE MECHANISM FOR THREE DIMENSIONAL INVESTIGATION OF CONDITIONS IN A FLUID FLOW

BACKGROUND OF THE INVENTION

1. Field of the Invention

The invention relates to a probe device for fluid flow investigations, and in particular, to a new traverse probe mechanism for fully three-dimensional flow investigation for subsonic and supersonic applications in turbo-machinery.

2. Description of the Prior Art

It is of interest to investigate the thermodynamic and mechanical behavior of turbo-machinery, such as a low pressure turbine apparatus particularly betwen blade rows. One obvious reason is that the results obtained from such investigations can be used as a verification tool for blade path design programs used in turbine apparatus.

For a complete thermodynamic flow investigation, among other parameters, the static and total pressure distribution, the circumferential and radial components of the flow vector, and temperature distributions along the axial and radial planes of the turbine blade path are required.

Presently, traverse probes are usually of the stem integral cylindrical design, and cannot generate accurate pressure measurements over a wide Mach number range. The present probe for turbine interstage measurements is not adjustable to radial flow angles. Also, the traverse shaft itself of the present probe cannot be positioned accurately, nor circumferentially (pitch) traversed with respect to the flow wakes of a stationary blade row. Accurate three-dimensional traversing must be carried out in order to gain further knowledge of the streamline distribution of the turbine under full and part load conditions. Direct velocity and angle measurements of the absolute flow vector under various conditions are needed, as such measurements will serve to reduce uncertainties in flow parameters, as, for instance, velocities, pressures and radial flow angles, and thus, energy coefficients.

In the prior art, total and static pressure traversing techniques are frequently used in turbine flow investigations. However, for the reason of limited access associated with the usual welded-in-place bushings of small diameter to guide the traverse shaft through several turbine cylinders, wedge probes or similar shaft integral probe heads have been applied. It has often been tried to incorporate measurement of radial flow angles with this technique, but due to the necessity of miniaturization of the sensing head, this was achieved only partially through calibrated fixed position probes.

An ideal probe would indicate the true values of total and static pressure independent of stream Mach numbers, Reynolds numbers or directional flow vector. The ideal probe would also utilize an angularly and radially adjustable probe head to measure both circumferential and polar angles of the fluid flow vector. Any flow component that is not symmetric to the sensing head axis should be eliminated in order not to influence true static pressure readings. All pressure sensing orifices should be located a reasonable distance from supporting structure for true reading of static and total pressures. For probing in pressure gradients, four static orifices should be located on the smallest possible diameter. The probe head support should allow geometrically accurate and repeatable positioning. Shaft bending and vibrational influences should be reduced to a minimum. The traverse probe shaft location should be adjustable in the axial and circumferential direction within at least one stator blade pitch.

SUMMARY OF THE INVENTION

This invention discloses a new pressure-sealed traverse probe mechanism for three-dimensional investigations of conditions in a fluid flow. The probe mechanism utilizes a sensing head mounted on a movable probe finger. The probe finger is movable in a radial, a circumferential, and a polar direction. In addition, a unique dual eccentric drive is utilized to displace the traverse shaft so that it can be accurately positioned on any point within a predetermined area. The probe utilizes a finger-like probe support, streamlined so as to provide minimum flow interference, having thereon a sensing head of either a conical or spherical shape. The conical shape is utilized for supersonic pressure sensing applications while the spherical sensing head is used in pressure sensing at subsonic applications. In addition, a probe finger having a total temperature sensing head is also provided.

Since the probe may be balanced in both polar and circumferential planes, direct measurements of both flow angles plus total and static pressures of the flow vector are obtainable. The probe provides for precision positioning of the sensing head within a predetermined range of the polar angle, and a predetermined circumferential range. The probe shaft is adjustably spring loaded to prevent the finger from vibrating.

The traverse shaft is also able to be precision positioned by the use of a dual eccentric shaft positioning control. Utilization of the dual eccentric control provides for accurate displacement of the probe shaft over a predetermined area, for example, straight line displacement over a blade pitch.

The traverse unit itself is fabricated of a pressure tight, self-supporting aluminum design and contains a stainless steel traverse probe shaft. There are outside mounted actuators for all motions, both dual eccentric drives and the three movements of the probe finger. Unlike other probe mechanisms of the prior art, the polar flow angle is measured by this invention by actually aligning the probe sensing head with the flow vector. In addition, also unlike many of the prior art probes, the support of the sensing head is designed to minimize the self-induced probe interference at the static pressure orifice plane. Therefore, calibration for this instrument is only suggested for initial verification.

It is an object of this invention to provide a new and imporved traverse probe mechanism for three-dimensional flow investigations in a fluid flow. It is a further object of this invention to provide a probe mechanism having an interchangeable sensing head mounted on a movable probe finger, the finger being movable in three directions, the radial, the circumferential and the polar.

It is desirable and therefore a further object of this invention to provide a pressure-sealed probe mechanism having a dual eccentric drive so that the probe shaft can be displaced and accurately positioned on any point within a predetermined area.

It is a still further object of this invention to provide a pressure-sealed probe mechanism having a dual eccentric positioning drive thereon that is particularly suited for use in fluid flows having a Mach number in the range from 0.1 to 1.8, a static pressure ranging from 0.5 p.s.i. to 15 p.s.i., a temperature range from 70°F to 250°F, and a moisture content of 0 to 12%.

BRIEF DESCRIPTION OF THE DRAWINGS

The invention will be more fully understood from the following detailed description of an illustrative embodiment, taken in connection with the following drawings, in which:

FIG. 2 is a diagrammatic view defining the motions of a probe finger utilized in the invention;

FIG. 9 is an elevational view, partially in section, of a probe finger member utilized in the invention;

FIG. 10 is a top view of a probe finger member utilized in the invention, taken along line X—X of FIG. 9;

FIG. 11 is a sectional view of a probe finger member taken along section line XI—XI of FIG. 9;

FIG. 12 is a sectional view of a probe finger member taken along section XII—XII of FIG. 9;

FIG. 16 is a sectional view of a control means utilized in the invention;

FIG. 17 is a sectional view of a control means utilized in the invention, taken along section line XVII—XVII of FIG. 16.

DESCRIPTION OF THE PREFERRED EMBODIMENT

Figure 1:
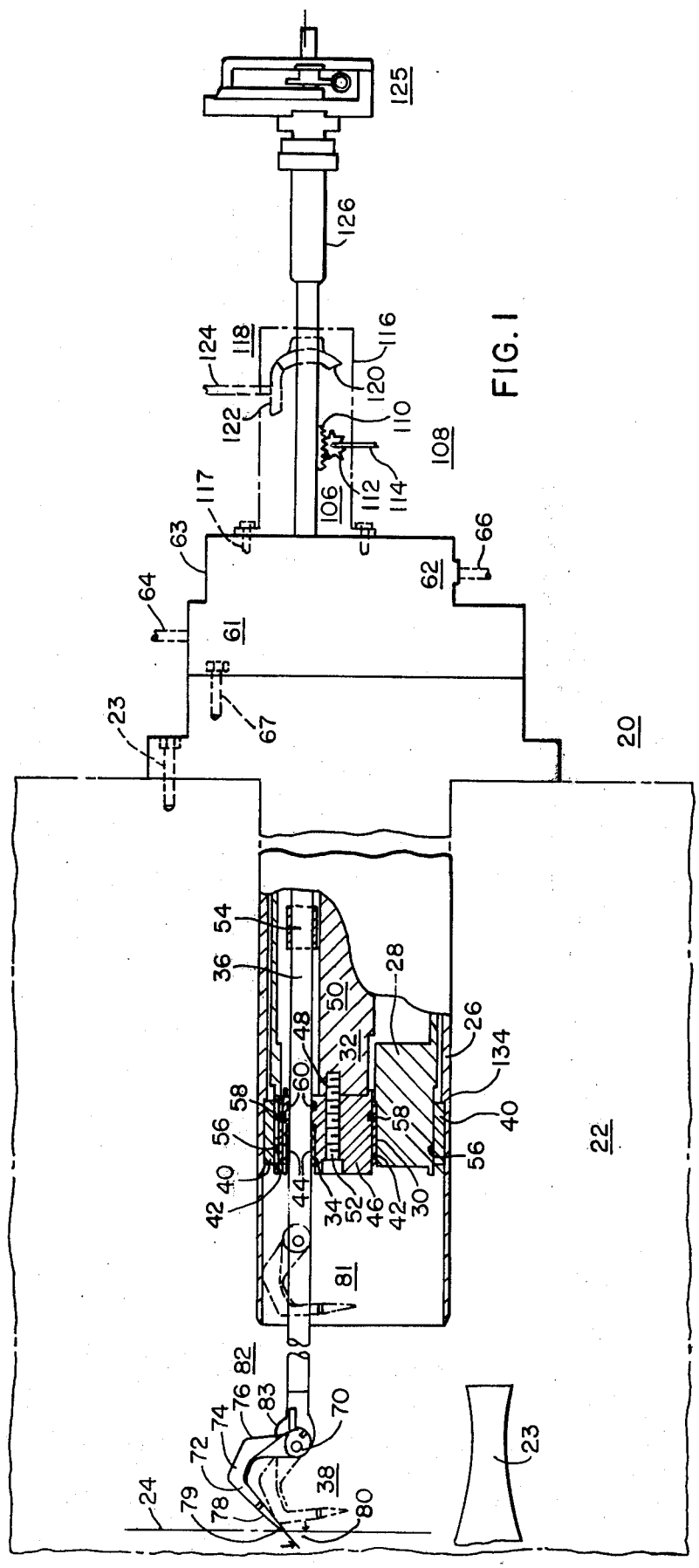
FIG. 1 is an elevational view, partially cut away for clarity, of the general contruction of a probe mechanism for three-dimensional investigation in a fluid flow.

Throughout the following description, similar reference characters refer to similar elements in all figures of the drawings.

FIG. 1 is an elevational view, shown partially in section for clarity, illustrating the general construction of a pressure-sealed probe for three dimensional investigation of conditions in a fluid flow. The probe 20 is rigidly attached to the outer casing of a turbomachine 22, by suitable attachment means. The probe 20 is inserted into the casing 22 in a direction perpendicular to the center line 24 of the turbine 22. The probe 20 may, however, be installed parallel or oblique, relative to a stator blade 23 of the turbine 22, in order to avoid possible passage blockage effects.

Figure 6:
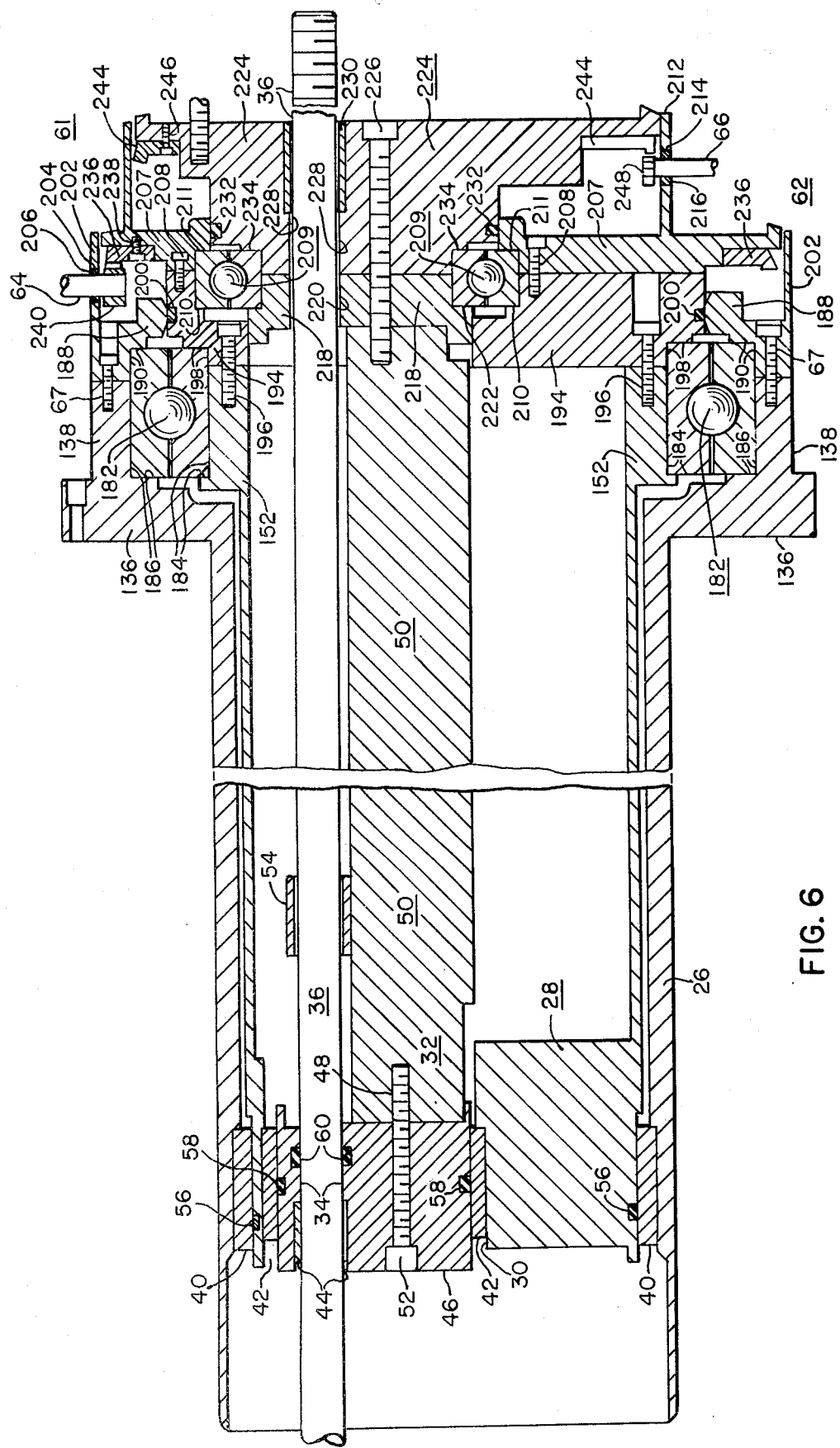
FIG. 6 is a sectional view of means for rotating the first and second rotatable members utilized in the invention.

Referring specifically to the portion of FIG. 1 that is cut away for clarity and to the expanded view of some elements to be herein described shown in FIG. 6, the probe 20 is comprised of an outer housing 26 fabricated from aluminum stock. The housing member 26 can be fabricated however, of any strong, lightweight, self-supporting material. A first member 28 is rotatably disposed and supported within the outer housing 26. The first rotatable member 28 is also coaxially disposed within the outer housing 26, and has an eccentrically disposed opening 30 extending through a portion thereof. A second rotatable member 32 is rotatably disposed within the opening 30 in the first rotatable member 28. The second rotatable member 32 has an eccentrically disposed opening 34 extending through a portion thereof. A probe support member 36 is movably disposed within the opening 34 in the second rotatable member 32. The probe support member 36 has mounted thereon a probe finger member generally indicated at 38. The probe support member 36 and the probe finger member 38 are both movable in a manner described more fully herein.

The first rotatable member 28 is supported within the outer housing 26 by a first bushing 40. The second rotatable member 32 is supported within the opening 30 in the first rotatable.member 28 by a second bushing 42. The probe support member 36 is supported within the opening 34 in the second rotatable member 32 by a third bushing 44. In the embodiment of the invention illustrated in FIG. 1 and 6, the second rotatable member 32 is comprised of a short, cylindrical member 46 having an opening 48 therethrough and attached to an elongated semispherical support member 50 by a bolt 52. The elongated solid semispherical support member 50 has mounted thereon a mounting support bushing 54 which provides axial support for the probe support member 36 along its axial length.

A first O-ring 56 surrounds the first rotatable member 28 and provides a pressure-tight sealed relationship between the first rotatable member 28 and the first bushing 40. A second O-ring 58 surrounds the second rotatable member 32 and provides a pressure-tight sealed relationship between the second rotatable member 32 and the second bushing 42. A third O-ring 60 surrounds the probe support member 36 as the probe support member 36 extends through the opening 34 in the second rotatable member 32. The third O-ring 60 provides a sealed relationship between the probe support member 36 and the second rotatable member 32; however, the movement of the probe support member 36 within the opening 34 of the second rotatable member 32 is not impaired by the third O-ring 60.

Means 61 for controlling the rotation of the first rotatable member 28 and means 62 for controlling rotation of the second rotatable member 32 are disposed within a housing generally indicated at 63. A first control shaft 64 actuates the means 61 which control the movement of the first rotatable member 28 and a second control shaft 66 actuates the means 62 hich control the movement of the second rotatable member 32. The means 61 for rotating the first rotatable member 28 controlled by the control shaft 64 is disposed so that the rotation of the first rotatable member 28 displaces both the second rotatable member 32 and the probe support member 36, which extends through the second rotatable member 32, from a first angular position to a second angular position. The means 62 for rotating the second rotatable member 32 controlled by the control shaft 66 is disposed so that the rotation of the second rotatable member 32 will displace the probe support member 36 from a first angular position to a second angular position; however, it is to be noted that rotation of the second rotatable member 32 alone will not cause rotation of the first rotatatable member 32 alone will not cause rotation of the first rotatable member 28. The means 61 for rotating the first rotatable member 28. The means 61 for rotating the first rotatable member 28 controlled by the control shaft 64 and the means 62 for rotating the second rotatable member 62 controlled by the control shaft 66 are cooperatively associated so that the simultaneous rotation of the first rotatable member 28 and the second rotatable member 32 will result in a displacement of the probe support member 36 from a first position to a second position. A detailed description of the dual eccentric control drive, including the means 61 for rotating the first rotatable member 28 and the means 62 for rotating the second rotatable member 32 is given herein in connection with FIG. 6. The housing 63 is attached to the outer housing 26 of the probe 20 by suitable means, illustrated in FIG. 1 by a bolt 67.

The probe finger member 38 is pivotally attached by a pin 70 to the probe support member 36. The probe finger member 38 comprises a first tubular portion 72, a streamlined second portion 74, and a third neck portion 76. The third neck portion 76 is pivotally mounted onto the probe member 36. A sensing head 78 is mounted in the tubular first portion 72 of the probe finger member 38. The probe finger member 38 is interchangeably mounted on the probe support 36 by the pin 70. The sensing head 78 has a predetermined number of pressure sensing orifices 79 therein. The sensing orifice 79 is normally disposed at a predetermined angle 80 relative to the centerline 24 of the turbine. The angle 80 is adjustable within a predetermined range. The probe finger member 38 is withdrawn into the housing 26 when not in use, as illustrated by ghosted probe finger shown at 81 in FIG. 1.

The probe finger 38 may have either a spherical or a conical sensing head 78 thereon, the choice being dependent upon the particular application of the probe mechanism involved. For the subsonic Mach number range, the probe finger having the blunt spherical sensing head is mounted onto the probe support 36. When the fluid flow is in the supersonic Mach number range, the probe finger is having the slender, conical sensing head mounted onto the probe suppport 36. Both the conical and the spherical sensing heads are provided with a total of five sensing orifices therein. The five orifice head, either spherical or conical, is best suited for sensing both flow angles of the velocity vector. In additon to the total pressure orifice, a pair of sensing orifices on each flow angle plane are utilized in such a manner that they are affected in opposite ways by a change of flow direction, the differential pressure between opposite sensing orifices being a sensitive indicator of flow direction.

The probe 20 is further comprised of means 82 for monitoring the conditions sensed, illustrated by plastic tubing 83 extending from each of the five sensing orifices 79 into the probe support member 36. The tubing 83 is connected to suitable sensing indicators (not shown) to display the conditions extant in the flow under consideration.

In addition, when the thermodynamic properties of the fluid extend into the superheated regions of the Mollier chart, a probe finger having a blunt, shielded temperature sensing head is utilized. The blunt sensing head has only one sensing orifice therein.

Whatever sensing head configuration is chosen, the primary advantage of the invention is that the sensing head 78 can be accurately oriented in the direction of the flow vector by utilization of a probe finger control means to be described more fully herein in connection with FIGS. 13 through 18.

Referring now to FIG. 2, a diagrammatic illustration of the motion of the probe support member 36 and the probe finger member 38 is shown. A standard orthogonal coordinate system, having an x-axis 84, a y-axis 85 and a z-axis 86, is illustrated, the axes oriented so that the z-axis 86 is aligned perpendicular to the centerline 24 of the turbine (as shown in FIG. 1). The probe support member 36 is rotatably and slidably disposed within the opening 34 in the second rotatable member 32. The probe finger 38 is pivotally mounted on the probe support member 36.

The probe support member 36 is adapted to radially displace the probe finger 38 relative to the centerline 24 of the turbine 22; that is, the probe finger 38 is displaced from the first position 87 to a second position 88 on the z-axis 86 by movement of the probe support 36 along the z-axis 86. The rectilinear displacement of the probe finger 38 on the z-axis is defined as being in the "radial" direction 89.

The probe support member 36 is also rotatable about its axis. That is, the probe support member 36 can be angularly displaced from a first angular position 90 to a second angular position 91, the angular displacement 92 thus generated being measured from the plane 94 defined by the y-axis 85 and the z-axis 86. This angular displacement 92, commonly referred to as "yaw" or circumferential angle, also defines the angular displacement of the probe finger member 38 from the plane 94.

In addition to the radial movement 89 and the circumferential movement 92 of the probe support member 36 and the probe finger 38, the probe finger member 38 is angularly displaceable in a plane 96, the plane 96 being perpendicular to a plane 98 defined by a given radial displacement 89 and a 360° angular displacement in the circumferential direction 92. The probe finger member 38 is angularly displaceable in the plane 96 from a first angular position 99 to a second angular positon 100. This displacement 102 of the probe finger 38 is defined as the polar or "pitch" direction.

It is thus seen that the probe finger 38 is thus rectilinearly displaceable in the radial diretion 89, angularly displaceable in the circumferential direcion 92 and angularly displaceable in the polar direction 102. By utilization of the three-directional movement of the probe finger member 38, orientation of the probe finger member 38 in the direction of the fluid flow vector is possible, thus facilitating accurate measurements of the conditions in the fluid flow line. Since the sensing head 78 on the probe finger 38 can thus be oriented, the conditions sensed by the sensing head 78 are true values, as compared to values obtained by applying correction factors to raw data as is done in the prior art.

In addition to measurement of both flow angles, the total and static pressures of the flow vector are to be sensed.

Referring again to FIG. 1, means for controlling the movements of the probe finger 38 in the above defined directions are generally indicated at 106. First means 108 for controlling the radial displacement 89 of the probe finger 38 comprise, in the embodiment illustrated in FIG. 1, a rack 110 and a pinion gear 112. The pinion 112 is controlled by a shaft 114. The first means 108 is attached to the probe support member 36. The first means 108 is housed in housing 116 attached to the outer housing 26 of the probe member 20 by suitable means, such as a bolt 117.

Second means 118 for controlling the angular displacement 92 in the circumferential direction are also connected to the probe support member 36. The second means 118 comprises, in the embodiment illustrated in FIG. 1, a driven bevel gear 120 mounted on the probe support member 36. A driving bevel gear 122 and a shaft 124 are attached to the driven bevel gear 120. Both the shaft 114 and the shaft 124 can be adapted for motor driven operation.

Third means 125 for controlling movement of the probe finger 38 in the polar direction 102 are housed in a housing 126. The third means 125 are more fully discussed herein. It is thus understood that once the radial position of the probe finger 38 has been set by the first means 108, the dual eccentric control drive comprising means 61 and 62 place the probe head 38 at any point in a given predetermined area. With the probe head 38 so located, means 118 and 125 orient the head 38 so as to sense the true values of the flow conditions at the point where the head 38 is located.

Means 61 and 62 are described in FIG. 6, while the means 108, 118 and 125 are described in FIGS. 13 through 18.

Figure 3:
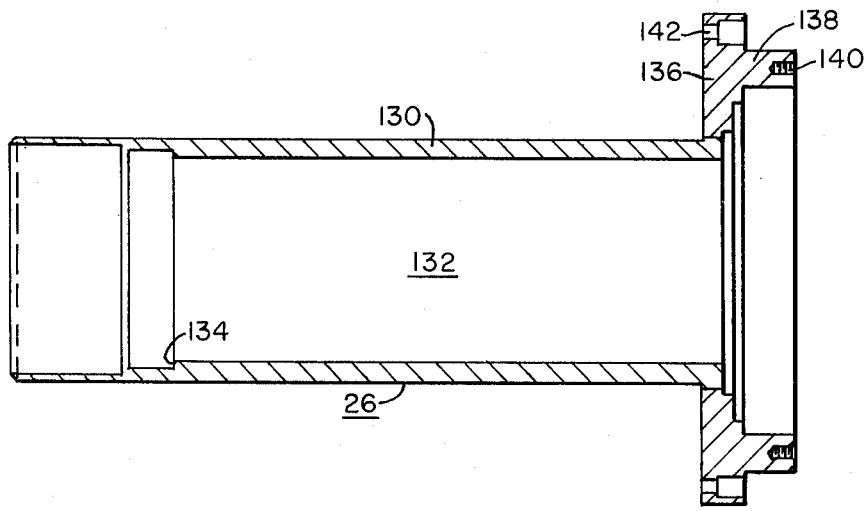
FIG. 3 is an isolated sectional view of an outer probe housing utilized in the invention.

Referring now to FIG. 3, an enlarged sectional view of the outer housing 26 of the probe 20 is illustrated. The outer housing 26 is comprised of an elongated tubular member 130 substantially cylindrical in shape. The tubular member 130 of the outer housing 26 is machined from aluminum stock, although any strong, self-supporting material may be used. The elongated tubular member 130 has a central axial opening 132 extending therethrough. A notch 134 is circumferentially disposed about the inner surface of the tubular portion 130. The notch 134 receives and supports the first bushing 40 (FIG. 1). The elongated tubular member 130 has a radially outward extending flange portion 136 thereon. The flange 136 has a ridge protrusion 138 thereon. The ridge 138 has an opening 140 therein. The housing 63 containing the first means 61 for rotating the first rotatable member 28 and the second means 62 for rotating the second rotatable member 32 is mounted on the ridge 138 of the outer housing 26 by the bolt 67 (FIG. 1). The bolt 67 is received by the opening 140 in the ridge 138. The flange 136 has an opening 142 therein, the opening 142 receiving the bolt 23 (FIG. 1) which attaches the outer housing 26 of the probe 20 to the casing 21 of the turbine 22.

Figure 4:
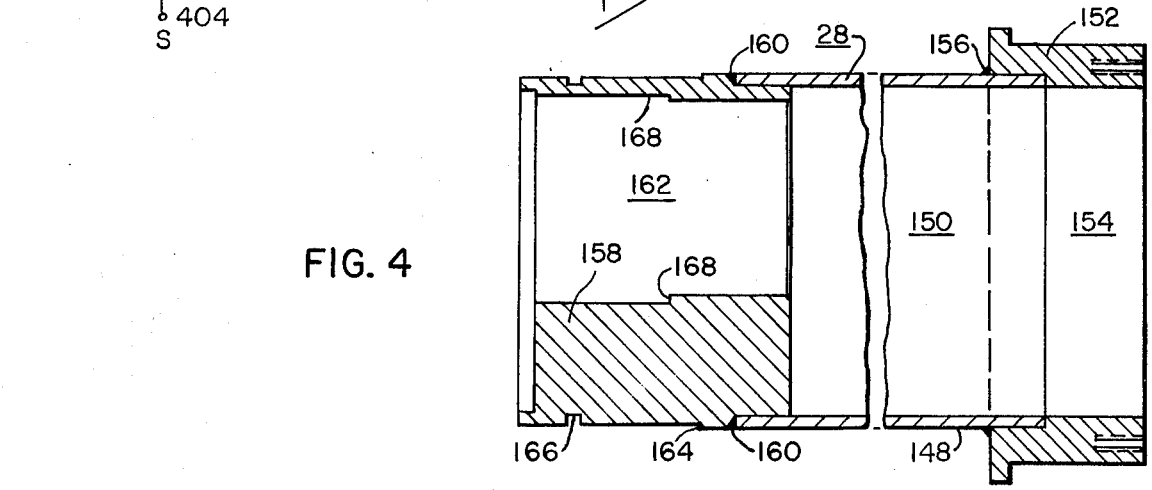
FIG. 4 is an isolated sectional view of the general construction of a first rotatable member utilized in the invention.

Referring now to FIG. 4, an isolated sectional view of the first rotational member 28 is illustrated. The first rotatable member 28 is comprised of an elongated cylindrical member 148 having a central axial opening 150 extending therethrough. A collar member 152, itself having a central axial opening 154 extending therethrough, is attached to the cylindrical member 148 by suitable means, illustrated by a weld bead 156.

The collar member 154 and the first cylindrical member 148 are attached so that the opening 154 in the collar member 152 aligns with the central axial opening 150 in the cylindrical member 148. A second, short, cylindrical member 158 is attached to the first cylindrical member 148 at the end of the cylindrical member 148 opposite the collar member 152, as illustrated by a weld 160. The short cylindrical member 158 has an eccentrically disposed opening 162 extending therethrough, the opening 162 through the short cylindrical member 158 communicating with the central axial opening 150 extending through the first cylindrical member 148. The communicating openings 150, 154 and 162 define the eccentrically disposed opening 30 (FIG. 1) which extends through a portion of the first rotatable member 28.

As shown in FIG. 1, the first rotatable member 28 is rotatably disposed within the central axial opening 132 (FIG. 3) of the outer housing 26. The first rotatable member 28 is coaxially disposed within the outer housing 26. The short cylindrical member 158 has a step 164 extending circumferentially about the exterior surface. The step 164 engages the first bushing 40 which supports the first rotatable member within the outer housing 26 (FIG. 1). The short cylindrical member has a notch 166 extending circumferentially about its outer surface. The notch 166 receives the first O-ring 56 which provides the pressure-tight, sealed relationship between the first rotatable member 28 and the first bushing 40. A step 168 is circumferentially disposed about the inner surface of the eccentrically disposed opening 162 through the short cylindrical member 158. The step 168 engages the second bushing member 42 which supports the second rotatable member 32 as it extends through the eccentric opening 162 in the first rotatable member 28.

Figure 5:
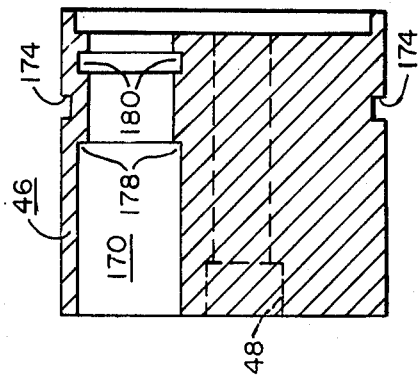
FIG. 5 is an isolated sectional view of the general construction of a portion of a second rotatable member utilized in the invention.

Referring now to FIG. 5, an isolated sectional view of the short-cylindrical member 46 is shown. The short cylindrical member 46, together with the elongated semispherical member 50 (FIG. 1), comprise the second rotatable member 32 of the probe 20. The short cylindrical member 46 has the eccentrically disposed opening 170 extending therethrough. The opening defines the opening 34 which is eccentrically disposed through a portion of the second rotatable member 32 (FIG. 1). The short cylindrical member 46 has the opening 48 extending therethrough. The opening 48 receives the bolt 52 (FIG. 1) which connects the short cylindrical member 46 to the elongated semispherical member 50 to form the second rotatable member 32. The short cylindrical member 46 has a notch 174 extending circumferentially about its exterior surface. The notch 174 receives the second O-ring 58. The second O-ring 58 provides a pressure-tight sealed relationship between the second bushing 42 and the second rotatable member 32.

A step 178 and a notch 180 extend circumferentially about the internal surface of the opening 170 that is eccentrically disposed through the short cylindrical member 46. The step 178 engages the third bushing 60 which supports the probe support member 36 as the probe support member 36 extends through the opening 34 in the second rotatable member 32. The notch 180 receives the third O-ring 60 which provides the pressure-tight seal between the probe support member 36 and the second rotatable member 32.

The first means 61 for rotating the first rotatable member 28 and the second means 62 for rotating the second rotatable member 32 comprises the dual drive which, coupled with the eccentric disposition of the second rotatable member 32 within the first rotatable member 28, and the eccentric dispostion of the support member 36 within the second rotatable member 32, permit the accurate displacement of the probe support member 36 (and hence the probe finger member 38) on any point within a predetermined area.

Referring now to FIG. 6, a sectional view of the first means 61 for rotating the first rotatable member 28 and the second means 62 for rotating the second rotatable member 32 is illustrated. The left-hand portion of the drawing is a detail view of the cut away portion of FIG. 1 and the elements described in detail above.

Referring now to the right-hand portion of the drawing, the first means 61 for rotating the first rotatable member 28 and the second means 62 for rotating the second rotatable member 66 are shown. The collar portion 152 of the first rotatable member 28 and the ridge portion 138 of the outer housing 26 simultaneously abut a first bearing member 182 as illustrated at 184 and 186 respectively. The first bearing member 182 provides a bearing surface so that the first rotatable member 28 can rotate with respect to the outer housing 26.

An end ring 188 is rigidly attached to the ridge portion 138 of the outer housing 26 by the bolts 67. The end ring 188 engages the first bearing member 182, as illustrated at 190.

A first bearing support ring 194 is rigidly affixed to the collar portion 152 of the first rotatable member 26 by suitable means, such as bolts 196. The first bearing support ring 194 engages the first bearing member 182 as illustrated at 198. An O-ring 200 provides a sealed relationship between the abutting portions of the end ring 188 and the first bearing support ring 194.

It can thus be seen that the first rotatable member 28 and the first bearing support ring 194 which is rigidly connected thereto are thus free to rotate on the first bearing 182 with respect to the outer housing 26 and the end ring 188.

The end ring 188 has a narrow lip portion 202 extending therefrom. The lip portion 202 has an opening 204 through which the first control shaft 64 extends. A bushing 206 supports the first control shaft 64 in the opening 204.

The first bearing support ring 194 is rigidly attached to a first gear support ring 207 by suitable means, such as a bolt 208. The first bearing support ring 194 and the first gear support ring 207 engage a second bearing member 209 as illustrated at 210 and 211 respectively. The second bearing member 209 provides the bearing surface on which the second rotatable member 32 rotates with respect to the first rotatable member 28. The first gear support ring 207 has a thin lip member 212 extending therefrom. The lip member 212 has an opening 214 through which extends the second control shaft 66. The second control shaft 66 is supported by a bushing 216 in the opening 214.

A ring spacer 218 having an opening 220 extending therethrough abuts the second bearing member 209 as illustrated at 222. A second gear support ring 224 is rididly attached to the ring spacer 218 and to the semispherical support bar 50 by suitable means, such as a bolt 226. The second gear support ring 224 has an opening 228 therethrough, the opening 228 aligning with the opening 220 so as to permit the probe support member 36 to extend axially through the opening 220 in the ring spacer 218 and through the opening 228 in the second gear support ring 224. A bushing 230 supports the probe support member 36 as it extends through the second gear support ring 224. An O-ring 232 provides a sealed relationship between the abutting portions of the first gear support ring 207 and the second gear support ring 224. The second gear support ring 224 engages the second bearing member 209 as illustrated at 234.

The second rotatable member 32, the ring spacer 218 and the second gear support ring 224 are free to rotate with respect to the first rotatable member 28 and the first gear support ring 194 on the second bearing member 209.

Vernier scales (not shown) are provided on the first gear support ring 207 and the second gear support ring 224 so that the extent of rotation of th first rotatable member 28 with respect to the outer housing 26 and the rotation of the second rotatable member 32 with respect to the first rotatable member 28 can be monitored.

A first driven gear 236 is mounted on the first gear support ring 207 by suitable means, such as a bolt 238. A first driving gear 240 is mounted on the first control shaft 64.

The first rotatable member 28 can be rotated with respect to the outer housing 26 by turning the first control shaft 64 causing the first driving gear 240 to engage the first driven gear 236. The first driven gear 236 is attached to the first gear support ring 207 which is in turn connected to the first bearing support ring 194. The first bearing support ring 194 is attached rigidly to the collar portion 152 of the first rotatable member 28. Thus, rotating the first control shaft 64 rotates the first rotatable member 28 relative to the outer housing 26 on the bearing surface provided by the first bearing member 182.

A second driven gear 244 is mounted on the second gear support ring 224 by suitable means, such as a bolt 246. A second driving gear 248 is mounted on the second control shaft 66.

Turning to the second control shaft 66 causes the second driving gear 248 to engage the second driven gear 244. The second driven gear 244 is mounted on the second gear support ring 224 which is in turn connected to the ring spacer 218 and the semispherical bar 50 by the bolt 226. The second rotatable member 32 thus rotates with respect to the first rotatable member 28 on the bearing surface provided by the second bearing member 209.

It is thus seen that the first rotatable member 28 can be rotated with respect to the outer casing 26 by the first control shaft 64. Since the second rotatable member 32 extends through the first, rotatable member 28 the means 61 for rotating the first rotatable member 28 are disposed so that the rotation of the first rotatable member 28 causes the second rotatable member 32 (and the probe shaft member 36 disposed within the second rotatable member 32) to be displaced from a first angular position to a second angular position.

Since the probe support member 36 is disposed within the second rotatable member 32, rotation of the second rotatable member 32 by the second control means 62 displaces the probe support member 36 from a first angular position. The second rotatable member 32 can be rotated independently of the first rotatable member 28.

The eccentric disposition of the second rotatable member 32 within the first rotatable member 28, and the eccentric disposition of the probe shaft 36 within the second rotatable member 32, in addition to the capability of the means 62 to rotate the second member simultaneously within and independent to the first rotatable member 28, provide the dual eccentric drive which enables the probe support member 36 to be displaced accurately from a first position to a second position within a predetermined area.

The bolt 117 attaches the rotational means 61 and 62 hereinabove described to the housing 116 (FIG. 1).

Figure 7:
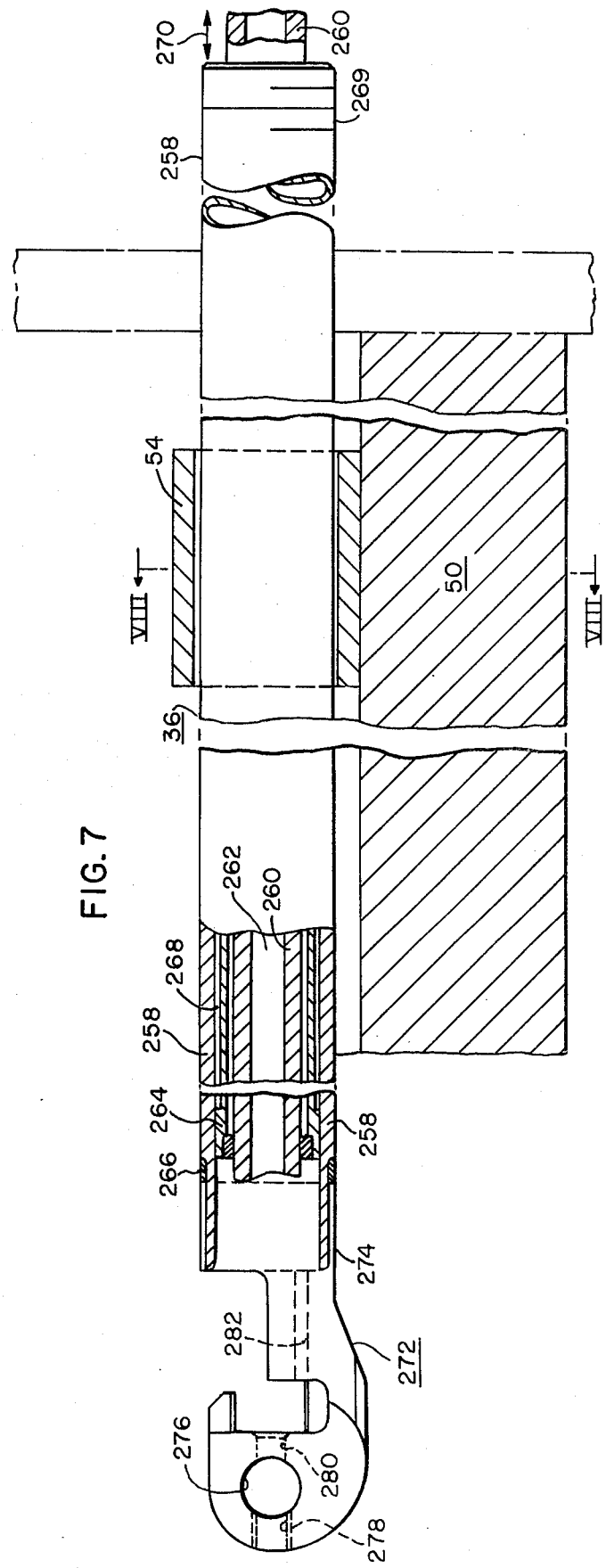
FIG. 7 is an elevational view, partially in section, of a probe support member utilized in the invention.

Referring now to FIG. 7, a detailed elevational view, partially in section, of the probe support member 36 is illustrated.

Figure 8:
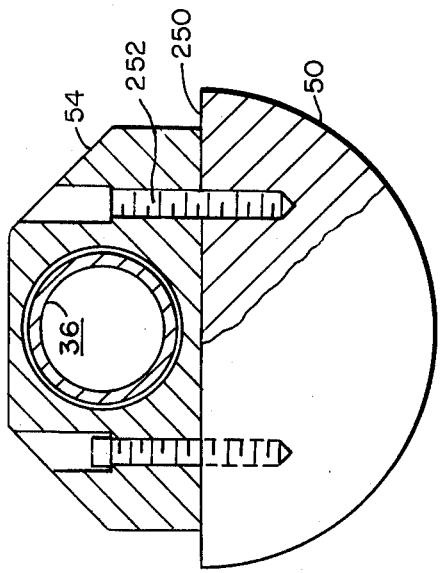
FIG. 8 is a sectional view, taken along section line VIII—VIII in FIG. 7, of a probe support member utilized in the invention.

The probe support member 36 is supported throughout its axial length by the semispherical support bar 50. The bushing 54, best seen in FIG. 8, is mounted on the flat surface 250 of the semispherical support bar 50 by a bolt 252. The bushing 54 provides support and guidance for the probe support member 36 throughout its axial length, but allows the probe support member 36 to rotate and slide freely within the bushing 54.

Referring again to FIG. 7, the probe support member 36 is comprised of an outer tube member 258 having a concentrically disposed inner tube member 260 disposed within the outer 253. The inner tube 260 and the outer tube 258 are both fabricated of thin-walled, hollow, metal tubing. The inner tube 260 has a central axial cavity 262 extending therethrough. The central axial cavity 262 of the inner tube 260 carries the means 82 for monitoring the conditions in the fluid flow line illustrated by the plastic tubes 83 (FIG. 1).

A first spring retainer 264 is attached rigidly to the inner tube 260, by suitable means, such as the weld illustrated at 266. The first spring retainer 264 extends between the outer tube 258 and the inner tube 260 for a predetermined axial distance, an annular chamber 268 being defined between the concentric tubes 258 and 260 for the remainder of the axial length of the inner tube 260 and the outer tube 258.

The outer tube 258 has a threaded portion 269 at one end of the outer tube 258. As illustrated at 270 in FIG. 7, the inner 260 extends a farther axial distance than does the outer tube 258.

A hook member 272 is attached to the outer tube 258 by suitable means, illustrated by a weld 274. The hook member 272 has an opening 276 extending therethrough, the opening 276 receiving the mounting pin 70 (FIG. 1) which pivotally mounts the probe finger member 38 to the probe support member 36.

A threaded opening 278 and an opening 280 extend axially through the hook member 272. A narrow opening 282 extends axially through the probe support 36 and the hook member 272.

Referring now to FIG. 9, an elevational view, partially in section of the probe finger member 38 is illustrated. The probe finger member 38 is fabricated of stainless steel or like material, and is comprised of the first tubular portion 72, the second streamline portion 74, and the third neck portion 76, having openings 284 therein. The particular probe head 78, either spherical or conical depending upon the probe finger 38 chosen, having sensing orifices 79 therein, is mounted within the first tubular portion 72. Stainless steel tubes 286 extend from each of the sensing orifices 79 through the interior of the tubular portion 72 and the streamline portion 74. The stainless steel tubes 286 extend to the openings 284 in the neck portion 76 of the probe finger 38. Just inside the openings 284 in the neck portion 76, each of the stainless steel tubes 286 are clamped to the corresponding plastic tube 83 by a cover plate 288 (FIG. 12). The plastic tubes 83, which comprise the means for monitoring the conditions sensed in the fluid flow are carried in the internal cavity 262 of the inner tube 260 (FIG. 8). The plastic tubes 83 are flexible and resilient and are fabricated or a suitable plastic material, such as that sold under the tradename "TYGON".

While passing through the first tubular portion 72 of the probe finger member 38, the stainless steel tubes 286 are oriented as shown in FIG. 11. While passing through the streamline portion 74 of the probe finger 38, the stainless steel tubes 286 are transposed so as to occupy the orientation shown in FIG. 12. The streamline second portion 74 of the probe finger 38 is so constructed so that the probe finger 38 provides the minimum interference possible to the fluid flow when the sensing head 78 is sensing the conditions in the fluid flow.

The cover plate 288 (FIG. 12) covers the first tubular 72 and the streamline portion 74 so as to completely enclose the stainless steel tubes 286 as they pass through the interior of the probe finger 38 to the exit through the openings 284.

Referring now to FIG. 10, a view of the probe finger 38 taken along line X—X of FIG. 9 is illustrated. In FIG. 10, the third neck portion 76 of the probe finger 38 has a first clevis arm 292 extending therefrom. The first clevis arm 290 and the second clevis arm 292 have an opening 294 extending therethrough. The opening 294 aligns with the opening 276 in the hook member 272 and receives the pin 70 by which the probe finger member 38 is pivotally attached to the probe support member 36. (FIGS. 7 and 1)

The first clevis arm 290 fo the third neck portion 76 has a slot 296 therein. The second clevis arm 292 has a cam 298 located on the inner surface thereof.

Figure 13:
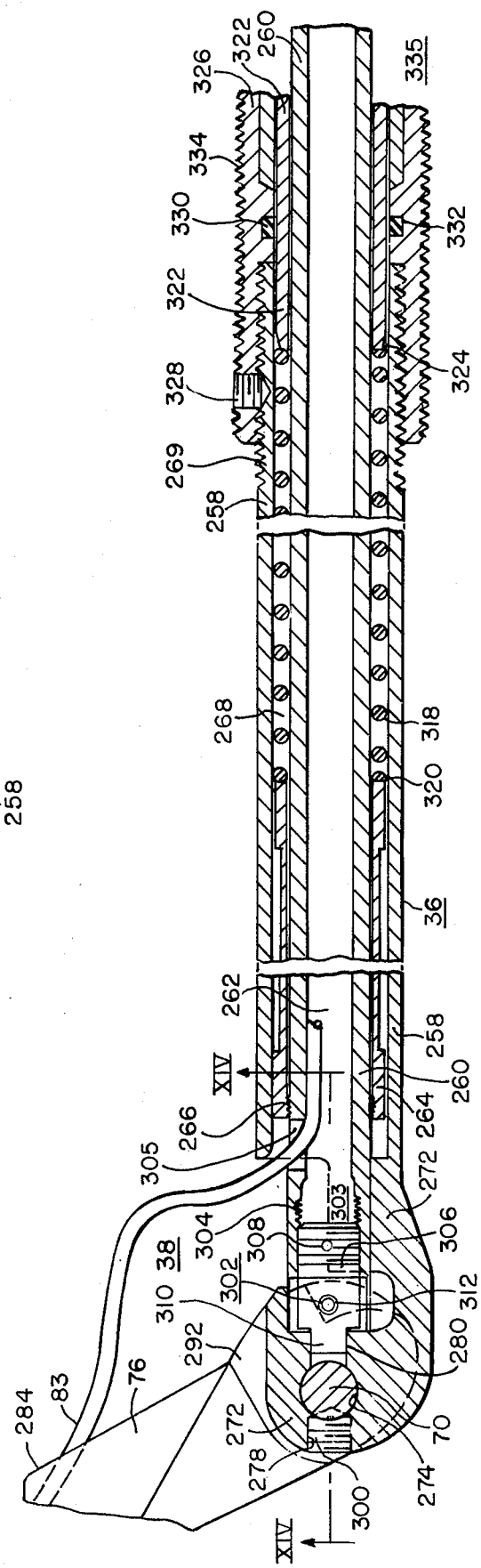
FIG. 13 is a sectional view of the interconnection of a probe finger member and a probe support utilized in the invention.

Referring now to FIG. 13, a detailed sectional view of the interconnections between the probe finger member 38 and the probe support member 36 is shown. The third neck protion 76 of the probe finger member 38 has the first clevis arm 290 and the second clevis arm 292 thereon. The first clevis arm 1290 and the second clevis arm 292 engage the hook member 272 of the probe support member 36 so that the opening 276 in the hook member 272 aligns with the opening 294 extending through the first clevis arm 290 and the second clevis arm 292. The pin 70 is inserted through the openings 276 and 294, thus pivotally mounting the probe finger member 38 to the probe support member 36. A set screw 300 is threaded into the threaded opening 278 in the hook member 272 to prevent slippage of the pivot pin 70.

The third means 125 for angularly displacing the probe finger in the polar direction 102 comprises a pin member 302 and drive means 303. The drive means element 303 of the third means 125 will be fully discussed herein, while the pin member element 302 of the third means 125 will be discussed in conjunction with FIG. 13.

The outer tube 258 and the inner tube 260 are most advantageously shown in FIG. 9. The inner tube 260 has a plurality of threads 304 extending about its inner circumference. The inner tube 260 has a slot 305 through which the plastic tubes 83 extend. The plastic tubes 83 extend through the openings 284 in the third neck portion 76 of the probe finger member 38 and then through the slot 305 and into the cavity 262 in the inner tube 260. The plastic tube 83 extends axially through the cavity 262 in the inner tube 260.

A pin holder 306 is threaded onto the threads 304 on the inner tube 260. The pin holder 306 is held securely in place by a fastener 308. The pin holder 306 has a nipple end 310 which extends into the opening 280 in the hook member 272.

Figure 14:
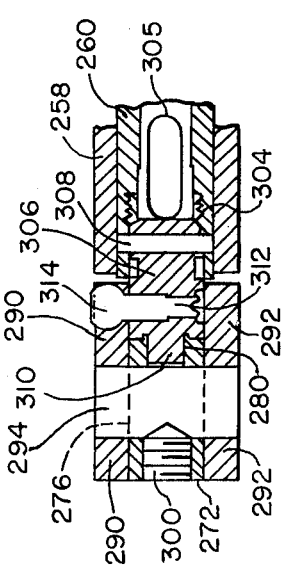
FIG. 14 is a sectional view of a probe finger member and a probe support member, taken along section line XIV—XIV of FIG. 13.

The pin holder 306 carries the pin member 302 (best seen in FIG. 14). The pin member 302 has a shaft portion 312 with a ball head 314 thereon. The ball head 314 of the pin member 302 engages the slot 296 in the first clevis arm 290 of the probe finger member 38.

The first spring retainer 264 is concentrically disposed between the inner tube member 260 and the outer tube 258. The first spring retainer 264 is attached securely to the inner tube 260 by the weld 266.

A torsion spring 318 occupies the annular chamber 268 which axially surrounds the inner tube 260. The torsion spring 318 is attached to the first spring retainer 264 as illustrated at 320. Referring to FIG. 14, a view taken along section lines XIV—XIV of FIG. 13 best illustrates the engagement of the ball head 314 of the pin member 302 into the slot 296 of the first clevis arm 290 of the probe finger member 38.

Referring again to FIG. 13, the extreme right-hand end of the drawing illustrates the end of the probe shaft member 36 opposite the pivotal attachment of the probe finger member 38 to the probe shaft member 36. The spring 318 in the annular chamber 268 is attached to a second spring retainer 322 as illustrated by a weld 324. The second spring retainer 322 is rotatable with respect to the inner tube 260. The outer tube 258 is threaded on the threads 269 into a sleeve member 326. The sleeve 326 has a set screw 328 which secures the outer tube 258 to the sleeve 326. A notch 330 has an O-ring 332 therein, which provides a seal between the second spring retainer 322 and the interior circumferential surface of the sleeve 326. The sleeve 326 has a thread 334 extending circumferentially about its exterior surface. The threads 334 are useful in regulating the torsion force imposed on the torsion spring 318 in a manner to be described more fully herein. The inner tube 260 extends a farther axial distance than the outer tube 258, as illustrated at 335 at the extreme right-hand end of FIG. 13.

Figure 15:
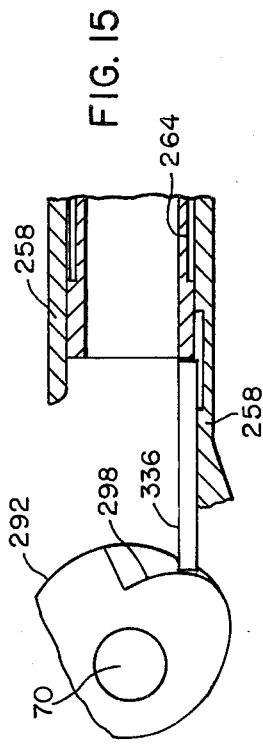
FIG. 15 is an isolated view of a portion of a probe finger utilized in the invention, with portions omitted for clarity.

FIG. 15 is a detailed view of the second clevis arm 292 of the third neck portion 76 of the probe finger member 38. The second clevis arm 292 has the cam 298 thereon. The cam has, resting movably thereon, a shaft 336. The shaft 336 is movably disposed with the opening 282 in the probe support member 36 (FIG. 9). The shaft 336 provides a useful retaining moment on the cam 298 of the probe finger 38.

Referring now to FIGS. 16 and 17, a detailed view of the third means 125 for angularly displacing the probe finger in the polar direction 102 (FIG. 2) is illustrated.

In FIG. 16, the drive means portion 303 of the third control means 125 is shown. The inner tube 260, which extends axially farther than the outer tube member 258 (FIG. 7), extends axially through a bottom plate 340 and a top cover plate 342. The top cover plate 342 is attached to the bottom plate 340 by suitable means, illustrated by bolts 343. The bottom plate 340 has a series of markings 344 (FIG. 16) etched therein to indicate the angular displacement of the probe finger member 38 actuated by the third means 125. A vernier dial 346, having etched markings 348 thereon, is secured to the inner tube 260 by a set screw 350.

A gear wheel 352 is attached to the inner tube 260 by a set screw 354. A shaft 356 extends through a mounting opening 358 in the bottom plate 340. The shaft 356 is spported in the opening 358 by a bushing member 360. A worm gear 362 is mounted on the shaft 356 by a set screw 364. A thrust bearing 366 supports the worm gear 362 against bushing 360. A knob 368 is attached to the shaft 356 by a set screw 370.

The probe finger 38 is angularly displaced in the polar direction 102 by the third means 125 by rotation of the shaft 356 using knob 368. Rotation of the shaft 356 causes the worm gear 362 on the shaft 356 to engage the wheel gear 352 attached to the inner tube 260. The vernier dial 346 is attached to the inner tube 260 in such a manner so that the angular displacement of the probe finger member 38 can be read by comparison of the etchings 348 on the vernier dial 346 and the etchings 344 on the bottom plate 340.

The inner tube 260 has threaded into its interior circumference the pin holder member 306 (FIG. 13). The pin holder 306 secures the pin 302, and especially the ball head 314, into the slot 296 in the first clevis arm 290 of the probe finger 38. Rotation of the inner tube 260 causes the ball head 314 to exert a force against the slot 296 on the first clevis arm 290 of the probe finger member 38. Since the probe finger member 38 is pivotally mounted on the hook member 272 of the probe support member 36, the probe finger member 38 can respond to the force exerted by the ball head 314 on the first clevis arm 290 of the probe finger 38 by angularly displacing the probe finger 38 in the polar direction 102 from a first angular position 99 to a second angular position 100 (FIG. 2).

The probe finger member 38 can thus be controlled in movement in the radial direction 89, the circumferential direction 92, and the polar direction 102. The first means 108 for radially displacing the probe finger member 38 and the second means 118 for angularly displacing th probe finger member 38, illustrated in FIG. 1, provide control for displacing the probe finger member 38 in the radial and circumferential directions. The third means 125 for angularly displacing the probe finger member 38 in the polar direction is the pin and slot drive comprised of the pin 302 and pin holder 306 (FIG. 13) and the drive means 303 (FIG. 16).

Referring now to FIG. 17, a sectional view of the third means 125 for angularly displacing the probe finger member 38 is shown. The bottom plate 340, the cover plate 342 and the vernier dial 346 are illustrated. Etchings 344 and 348 (FIG. 16) provide a method of monitoring the extent of displacement.

The wheel gear 352 is attached to the inner tube 260 by the set screw 354. The inner tube 260 extends through an opening 372 in the bottom plate 340 and through an opening 373 in the top cover plate 342. A bushing 374 supports the inner tube 260 in the opening 372 while a thrust bearing 375 supports the wheel gear 352 against the top cover plate 342. The vernier dial 346 is attached to the inner tube 260 by the set screw 350. The control shaft 356, having the worm gear 362 thereon, engages the worm wheel 352 to displace the probe finger member 38.

In FIG. 17, means 376 for regulating the torsion force imposed by the spring 318 is shown. The spring 318 occupies the annular chamber 268 that lies between the outer tube 258 and the inner tube 260. The torsion spring 318 is resting at one end thereof on the first spring retainer 264 (FIG. 13). The first retainer 264 is rigidly attached to and gliding along the inner tube member 260. The spring 318 is resting at the other end thereof to the second spring retainer 322. The second spring retainer 322 is free to rotate with respect to the inner tube 260. The second spring retainer has protruding flanges 377 and an O-ring 378 which provides a sealed relationship between the second retainer 322 and the inner tube 260.

The outer tube 258 is threaded into the sleeve 326 and secured into the sleeve 326 by the set screw 328. The O-ring 332, which extends circumferentially about the inner surface of the sleeve 326 provides a sealed relationship between the sleeve 326 and the second spring retainer 322. The sleeve 326 has the threads 334 extending circumferentially about the exterior surface of the sleeve 326.

The sleeve 326 has a flange portion 380 attached to the underside of the bottom plate 340 by suitable means, illustrated by a bolt 382. The sleeve 326 has slots 384 disposed 180° apart extending for an axial distance along the sleeve 326. The slots 380 receive the flange portions 377 of the second spring retainer 322. The flanges 377 of the second spring retainer 322 protrude beyond the slots 384 in the sleeve 326.

A collar member 386, having a lip 388 thereon, is mounted over the protruding flanges 377 of the second spring retainer 322. The lip 388 engages the protruding flanges 377 of the second retainer 322. A knob 390 brackets the side of the protruding flanges 377 opposite the lip 388 of the collar 386. The knob 390 is threaded on its inner surface and the threads of the knob engage the threads 334 on the sleeve 326. The knob 90 and the collar 386 are rigidly fastened by a bolt 392.

The flange protrusions 377 of the second spring retainer 326 are thus securely bracketed by the knob 390 and collar 386. In order to adjust the torsion force in the spring 318, the knob 390 and collar 386 unit is rotated on the threads 334 on the sleeve 326. A scale (not shown) etched into the axial portion of the sleeve 326 indicates the amount of torsion force imposed on the spring 318. A set screw 394 locks the knob 390 in position on the sleeve 326.

A stopper 396 is inserted into the inner tube 260 at the extreme end thereof. The plastic tube 83, carried within the central axial cavity 262 of the inner tube 260, passes through the stopper 396. The conditions monitored by the sensing head 78 are then monitored as a record of the investigation of the fluid flow conducted using the probe 20.

The torsion force imposed on the inner tube 260 by the spring 318 prevents oscillation of the probe finger 38 during investigations in the fluid flow line.

It was noted in conjunction with FIG. 15 that the shaft 336 resting on the cam 298 of the second clevis arm 292 of the neck portion 76 of the probe finger 38 provides a retaining moment on the cam 298. In conjunction with FIG. 15, attention is directed to FIG. 18.

Figure 18:
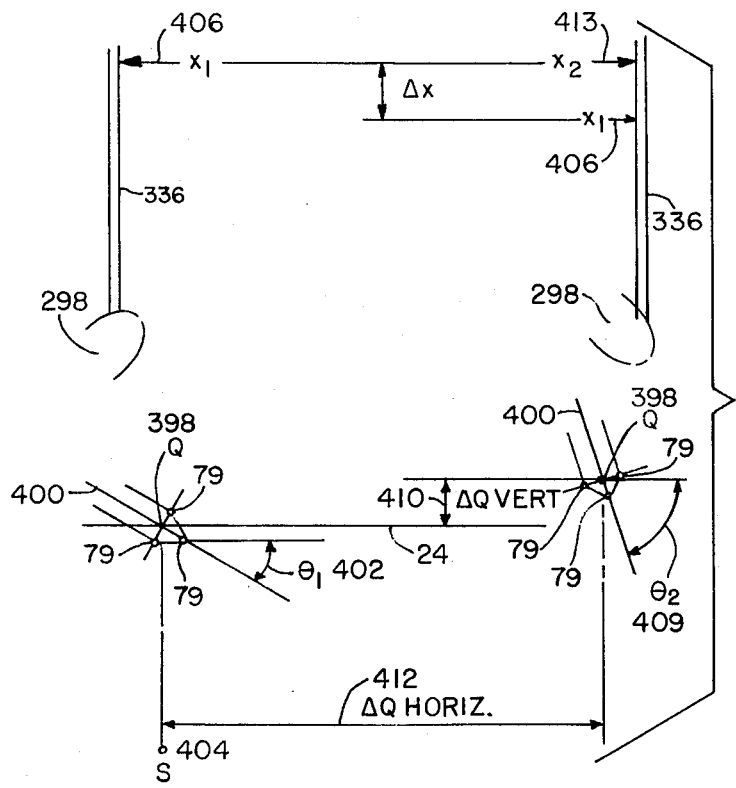
FIG. 18 is a diagrammatic view defining an alignment procedure utilized by the invention.

In FIG. 18, a diagrammatic view of the alignment function of the probe finger 38 is illustrated. It was previously noted that both the conical sensing head and the spherical sensing head have five sensing orifices therein. Four of the five orifices are disposed about the circumference of the sensing head, while the fifth orifice occupies the tip of the sensing head 78.

In FIG. 18, point Q, indicated by reference numeral 398, is the center of a plane containing the four sensing orifices 79 disposed circumferentially about the spherical or conical sensing head 78. When the probe finger 38 is oriented so that the centerline 400 extending through the fifth orifice 79 on the sensing head 78 describes a given angle $\theta_1$, indicated by numeral 402, with the centerline 24 of the turbine, the point Q is aligned with a given fixed point "S" indicated by reference numeral 404. While the fifth orifice defines an angle $\theta_1$, the shaft 336 rests on the cam 298 on the second clevis arm 292, so that a given value $x_1$, numeral 406, as indicated on the shaft 336.

When the third means 125 for displacing the probe finger 38 in the polar direction 102 is utilized, the pin and slot drive described in connection with FIG. 16 displaces the probe finger 38 and the fifth orifice 79 thereon so that the centerline 400 through the fifth orifice defines a second angle $\theta_2$ (408), different from $\theta_1$, with the centerline 24 of the turbine 21. When this occurs, the point Q (numeral 398) occupies a second position, displaced from its original position a distance $\Delta$ Q vertical, the displacement indicated by numeral 410. In addition, the point Q is horizontally displaced a distance $\Delta$ Q horizontal, indicated by numeral 412. The point Q, when displaced distances 410 and 412, no longer aligns with the fixed point "S", (404).

When the probe finger 38 is displaced, the cam 298 moves therewith and the shaft 336 is moved form position $x_1$ (406) to a new position $x_2$ (413).

The amount of angular displacement of the first rotatable member 28 and the second rotatable member 32 that must be accomplished in oroder to reorient the point Q (398) with the fixed point S (404) is read on the scale 346 (FIG. 16) associated with the third means 125. This compensation must be accomplished so that the sensing orifices will measure the conditions in the fluid flow line at the same point S (404) but with the angle between the centerline 400 through the fifth orifice and the centerline 24 of the turbine 21 being changed from $\theta_1$ (402) to $\theta_2$ (408). When the compensation has been effected by utilization of the dual eccentric drive, measurements of the conditions relative to the same fixed point S (404), but with a different fifth orifice angle (402), will be insured.

In summary, it is clear that the probe mechanism disclosed by this invention provides a more flexible and accurate probe device for three-dimensional investigation of conditions in the fluid flow line. The probe provides accurate displacement of the sensing head in a radial circumferential, and polar direction. In addition, a dual eccentric drive provides for accurate relocation of the probe shaft to any point within a predetermined area.

I claim as my invention:

1. A probe for three-dimensional investigation of conditions in a fluid flow path, said probe comprising:
    an elongated tubular outer housing;
    a first member rotatably and coaxially disposed within said outer housing, said first rotatable member including an elongated cylinder having a central axial opening extending therethrough, a collar having a radially outwardly extending flange portion thereon and a central axial opening extending therethrough, said collar being attached to said elongated cylinder so that the central axial opening in said collar aligns with the central axial opening extending through said elongated cylinder, a short cylinder attached to said elongated cylinder opposite collar, said short cylinder having an eccentrically disposed opening extending therethrough, the opening in said short cylinder communicating with the central axial opening extending through said elongated cylinder and said collar, a second member rotatably disposed within the eccentric opening in said short cylinder, said second member having an eccentrically disposed opening extending through a portion thereof;

an elongated probe support member rotatably and slidably disposed within the opening in said second member;

a movable probe finger pivotally attached to said probe support member;

a sensing head member rigidly attached to said probe finger member, said sensing member having a sensing orifice therein;

first means for axially displacing said probe finger member from a first axial position to a second axial position;

second means for angularly displacing said probe finger from a first angular position to a second angular position;

third means for displacing said probe finger from a first orientation to a second orientation with respect to said pivotal attachment of said probe finger;

means for rotating said first member, rotation of said first member displacing said second member from a first angular position to a second angular position;

means for rotating said second member, rotation of said second member displacing said probe shaft from a first angular position to a second angular position, said first rotating means and said second rotating means being disposed so that simultaneous rotation of said first and second means displaces said probe support from a first position to a second position; and, means for monitoring conditions in said fluid flow path.

2. The probe of claim 1 wherein said second rotatable member comprises a cylindrical member having an eccentrically disposed opening extending therethrough and a solid, bar member connected to said cylindrical member.

3. The probe of claim 2, wherein said probe support member comprises:

an outer tube having a hook member attached at one end thereof;

and an inner tube coaxially disposed within said outer tube; and, said first means for axially displacing said probe finger member and said second means for angularly displacing said probe finger member being attached to said outer tube.

4. The probe of claim 3, wherein said probe finger comprises:

a first tubular portion;

a streamlined second portion; and, a third neck portion having a clevis thereon, said clevis having two extending arm portions, said clevis being pivotally mounted on said hook portion of said outer tube, the first arm portion of said clevis having a slot therein, the second arm portion of said clevis having a cam disposed thereon.

5. The probe of claim 4, wherein said probe shaft further comprises an intermediate tube disposed concentrically between said inner and said outer tube, said intermediate tube being attached to said inner tube, and means for imposing an adjustable torsion force on said inner tube, said means being attached to said intermediate tube.

* * * * *